UNITED STATES PATENT OFFICE.

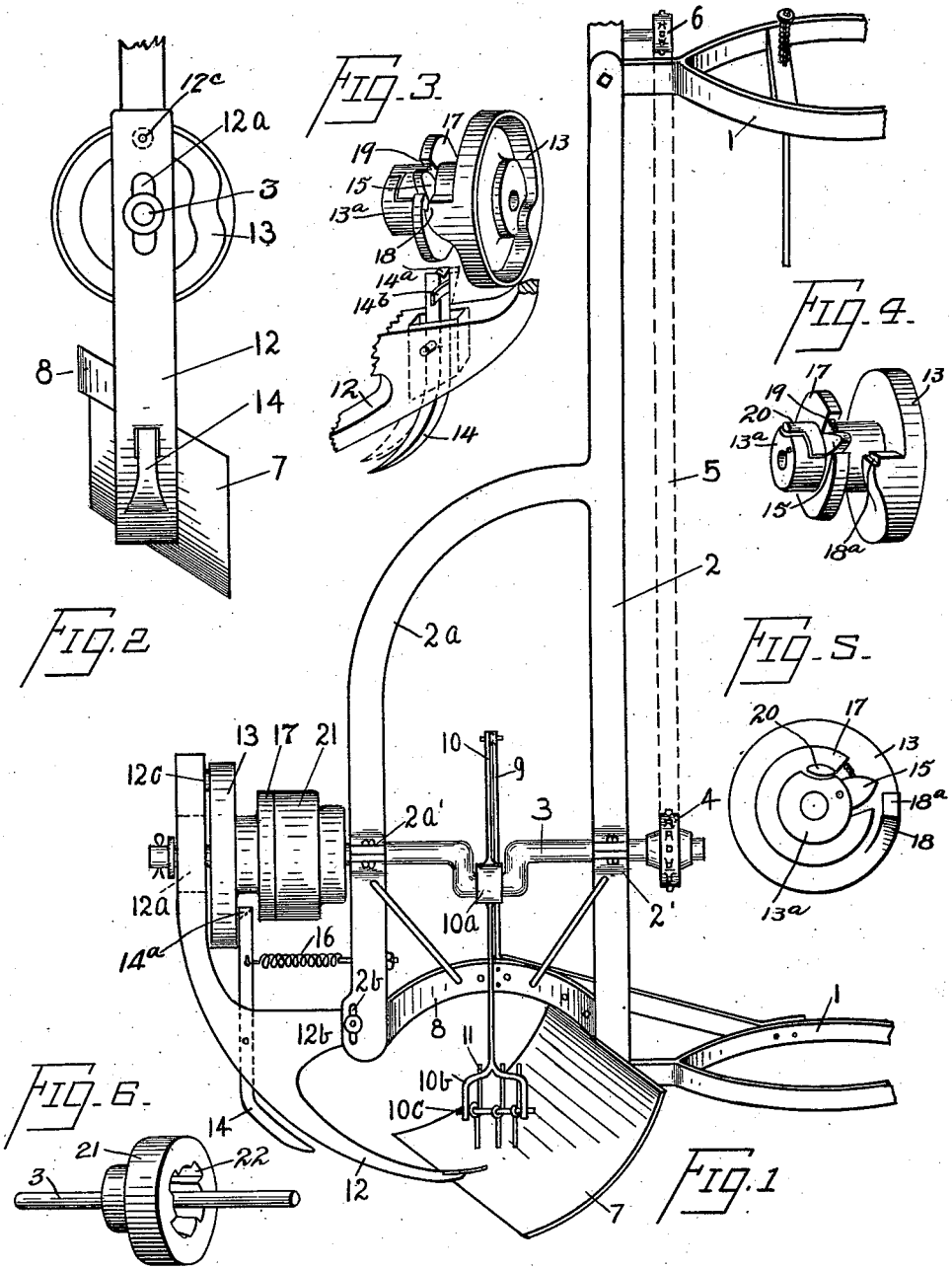

EDWARD LANG, OF SAGINAW, MICHIGAN.

BEET-TOPPER.

1,019,056.  Specification of Letters Patent.  Patented Mar. 5, 1912.

Application filed January 28, 1911. Serial No. 605,312.

*To all whom it may concern:*

Be it known that I, EDWARD LANG, a citizen of the United States, residing at Saginaw, in the county of Saginaw and State of Michigan, have invented certain new and useful Improvements in Beet-Toppers; and I do hereby declare the following to be a full, clear, and exact description of the invention, such as will enable others skilled in the art to which it appertains to make and use the same.

This invention is a beet topping machine, and pertains more particularly to improved means whereby the tops are cleared from the topping knives after being severed, and means whereby each beet is topped at the proper distance from the crown, that is, a large beet projecting unusually high above the surface of the ground will be topped the same distance down from its crown that a smaller beet is, even though the smaller beet may project less out of the ground.

Heretofore automatic topping machines have been provided with means by which each beet is topped at a certain distance above the ground, but it has been found in practice that such machines are not commercially successful for the reason that large beets projecting a considerable distance out of the ground are severed close to the ground, thereby wasting a large percentage of the sugar content of the beet.

My invention is illustrated in the accompanying drawings, in which—
Figure 1 is a side elevation partly in perspective, showing the operating mechanism of my improved beet topper, the machine to which the topper is attached and the means by which the topping mechanism is driven being omitted from the drawings for the sake of clearness as they form no part of my invention; Fig. 2 is a front view of the cam by which the main topping guide is raised and lowered; Fig. 3 is a detail of the auxiliary trip guide. Fig. 4 is a side view of the clutch; Fig. 5 is an end view; and Fig. 6 is a detail of the hub of the clutch.

As is shown in the drawings, the invention consists in the topping mechanism, which is preferably supported by means of any suitable or convenient frame work 1, which may, if desired, be mounted on any convenient vehicle, as for instance a beet lifter, the frame 1 being capable for being raised and lowered vertically by any desired means (not shown) so as to raise and lower the entire topping mechanism. Upon the frame work 1 is provided a vertical bar 2 carrying a second vertical bar $2^a$. The bars 2 and $2^a$ are provided with bearings $2'$ and $2^{a'}$, in which is mounted a crank shaft 3. This crank shaft is provided at one end with a sprocket 4 driven by a chain 5 from a sprocket 6 or in any other suitable manner, it being only essential that the shaft 3 shall be adapted to revolve continuously while the machine is in operation, even though the frame 1 is moving up and down. At the lower end of the vertical bar 2 is carried a topping blade 7, and connecting the lower ends of the vertical bars 2 and $2^a$ is a curved cross-bar 8. Midway between the ends of cross-bar 8 is attached an upright 9, and pivoted to the upper extremity of the upright 9 is an arm 10 having a bearing $10^a$ intermediate its ends, the bearing $10^a$ surrounding the crank of shaft 3. At the lower end of arm 10 is a fork $10^b$ having a cross-bar $10^c$ on which are pivotally mounted a number of fingers 11. The arm 10 with its fork and the fingers 11 form a sweeper, which, oscillated by the crank, sweeps back and forth across the topping blade 7 to clear it of beet tops and weeds.

My invention comprises means by which the height of the topping blade 7 relative to the beet, is automatically regulated as the topping blade approaches the beet. For that purpose I employ the following mechanism: A curved finger 12, which I term the main topping guide, extends downwardly and rearwardly from the front end of shaft 3, upon which it is mounted by means of a vertical slot $12^a$. The main topping guide has also a rearwardly extending arm $12^b$ pivotally mounted in a vertical slot $2^b$ formed in the bar $2^a$, so that the main topping guide 12 has a limited up-and-down movement with relation to the topping blade 7, being guided by the shaft 3 and by the slot $2^b$. The means will now be described by which the main topping guide is ordinarily held in fixed relation with the topping blade, but when the auxiliary topping guide comes in contact with a beet, the relation of topping guide 12 to blade 7 is suddenly altered so as to change the amount cut from the top of the beet. It is to be understood that under ordinary circumstances, *i. e.* when the auxiliary shoe is not in contact with a beet, guide 12 is not moved up and down by the cam mechanism, which will now be referred to.

The shaft 3 ordinarily revolves loosely within cam 13 and the cam is engaged by a roller 12ᶜ carried by the upper end of the main topping guide 12. When the cam rotates, the topping guide 12 is lifted to the top of its travel through nearly the entire revolution of cam 13 and during the short remainder of the revolution of the cam the guide 12 drops slightly and quickly returns to its original position. When the topping guide 12 passes over a beet of ordinary height, that is, one in which the distance from the crown to the topping point is about an average of that on all the beets to be cut, the vertical distance from the topping guide 12 to the cutting edge of the topping blade 7 is fixed. But when a beet of unusual height is approached it is necessary that the vertical distance from the guide 12 to the edge of blade 7 shall be temporarily increased so that the larger beet may be topped deeper that the smaller beets.

To automatically increase the vertical distance between the guide 12 and the blade 7 when a large beet is approached, I employ the following mechanism: A curved shoe 14 which I term a trip guide, is pivotally mounted on the middle part of the main topping guide 12 so as to have a limited oscillatory movement, as is illustrated in Fig. 3. Beets of ordinary height do not come in contact with the trip guide 14, but a beet that projects an unusual height above the ground and consequently requires deeper topping, will strike the trip guide 14 and move its upper notched end 14ᵃ horizontally, as shown in Fig. 3. In its normal position trip guide 14 holds cam 13 locked against turning, the cam being in such a position that the main topping guide 12 is in its lowermost position. When trip guide 14 strikes a beet of extra height, the upper end of guide 14 releases cam 13 so that the cam may revolve. At the same time cam 13 becomes locked to shaft 3 (by a mechanism which will presently be described) so that the cam revolves and raises the main topping guide 12 to its highest position relative to the topping blade 7. The beet is thus topped deeper than were the preceding beets. Meanwhile, cam 13 has revolved until it reached its original position and the clutch is automatically thrown out and the upper end of trip guide 14 is again locked to the cam so that shaft 3 may continue to revolve and the main topping guide 12 remains locked in the position which it occupies when topping ordinary beets. Trip guide 14 is normally held in its down position by means of a spring 16 attached to the bar 2ᵃ.

The clutch by which cam 13 is automatically fixed to shaft 3 while the shaft revolves through one revolution only, is illustrated in Figs. 3, 4, 5 and 6. The means by which cam 13 is automatically held against turning, by means of the upper end 14ᵃ of trip guide 14, is illustrated in Fig. 3, to which reference will now be had. Cam 13, as has been previously described, is arranged so that shaft 3 may revolve freely within cam 13 while the latter is stationary. The notched end 14ᵃ normally holds cam 13 against turning, by means of the following device: Mounted on the hub 13ᵃ of cam 13 is a spring-pressed finger 15 having a pointed end adapted to be received in the notched end 14ᵃ of trip guide 14. When trip guide 14 encounters a high beet, the notched end 14ᵃ, being moved as indicated by dotted lines in Fig. 3, releases finger 15 and allows the cam 13 to revolve, the means by which the cam 13 is revolved being a clutch device which will presently be described. As soon as the revolution of the cam commences, the main topping guide 12 rises, lifting with it the trip guide 14, thereby raising the end 14ᵃ and bringing it between the rear face of the cam 13 and a flange 17 carried by the hub of the cam. When the revolution of the cam is nearly completed, the guide 12 again drops, releasing the end 14ᵃ from between the back of the cam and the flange 17 and thereupon the end 14ᵃ is pushed over to its original position in line with flange 17, and into engagement with the finger 15, it being pushed over by a lateral projection 18 formed on the rear face of the cam 13. When notch 14ᵃ again engages finger 15, revolution of the cam 13 is stopped, leaving guides 14 and 12 in their original position.

The means by which cam 13 is first unlocked from and then locked to shaft 3 will now be described.

Finger 15 is mounted in a recess in the flange 17 and is pressed by a spring 19. The opposite end of the finger carries a lug 20 which rises up from the periphery of the hub 13ᵃ when the spring 19 is released. The lug and the hub 13ᵃ are both contained in a housing 21 keyed to the shaft 3 and provided with a recess 22 adapted to receive the lug 20 when the spring 19 forces the finger 15 over, as shown in Fig. 4, thereby locking cam 13 to the shaft 3, as previously described. When the notched end 14ᵃ of trip guide 14 releases finger 15, as above described, cam 13 becomes locked to shaft 3 and revolves with it. When cam 13 has made one revolution, the lateral projection 18 restores end 14ᵃ to its engagement with finger 15, thereby unlocking cam 13 from shaft 3. To prevent spring 19 from re-acting and thereby accidentally throwing the cam into engagement with the shaft, I provide on end 14ᵃ a spring stop 14ᵇ adapted to enter into a notch 18ᵃ on the lateral projection 18, thereby preventing any accidental backward movement of the cam 13 or of the finger 15.

From the above description it will be seen that the entire mechanism will rise and fall with the movement of frame 1, that the main topping guide 12 will normally remain in its proper position relative to shoe 7 so as to correctly top beets of ordinary height, but when a larger beet is encountered, auxiliary trip guide 14 automatically releases cam 13 and throws it into engagement with shaft 3 so that the cam revolves, thereby temporarily raising the main topping guide 12 relative to the topping knife 7 so that the large beet is topped deeper than the smaller beets, and immediately the original adjustment of the main topping guide 12 with the shoe 7 is restored, it will so remain until another large beet is encountered when the operation, as above described, is repeated.

By the means above described I have produced a beet topper that is simple in construction and not liable to get out of order, that will automatically distinguish between tall beets and short beets, and will also keep the topping knife free from beet tops and weeds.

Having described my invention, what I claim and desire to secure by Letters Patent, is:—

In a beet topping machine, the combination of a vertically movable frame, a topping knife secured thereto, a crank shaft on said frame, a fork actuated by said crank shaft, a topping guide vertically movable on said frame, a topping guide carried by said vertically movable guide, a rotatable clutch-actuated cam adapted to contact with said topping guide, a clutch, and means carried by said clutch adapted to rotate said cam.

In testimony whereof, I affix my signature in presence of two witnesses.

EDWARD LANG.

Witnesses:
 CHRISTINE A. BRAIDEL,
 GEO. W. SMITH.

---

Copies of this patent may be obtained for five cents each, by addressing the "Commissioner of Patents, Washington, D. C."